(12) United States Patent
Hatagami

(10) Patent No.: US 7,230,787 B2
(45) Date of Patent: Jun. 12, 2007

(54) METHOD AND APPARATUS FOR HEAD CONTROL, AND DISK-DRIVE APPARATUS

(75) Inventor: Toshifumi Hatagami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 128 days.

(21) Appl. No.: 10/963,754

(22) Filed: Oct. 13, 2004

(65) Prior Publication Data

US 2005/0141122 A1 Jun. 30, 2005

(30) Foreign Application Priority Data

Oct. 15, 2003 (JP) ............................ 2003-354963

(51) Int. Cl.
*G11B 21/12* (2006.01)
*G11B 15/46* (2006.01)
*G11B 20/14* (2006.01)

(52) U.S. Cl. ..................... 360/75; 360/73.03
(58) Field of Classification Search ............... None
See application file for complete search history.

(56) References Cited

U.S. PATENT DOCUMENTS 4,724,495 A * 2/1988 Hedberg et al. .............. 360/22
6,236,527 B1 5/2001 Uchiike et al.
6,476,996 B1 11/2002 Ryan

FOREIGN PATENT DOCUMENTS

JP 11-16259 1/1999

* cited by examiner

*Primary Examiner*—Andrea Wellington
*Assistant Examiner*—Jason Olson
(74) *Attorney, Agent, or Firm*—Greer, Burns & Crain, Ltd.

(57) ABSTRACT

An apparatus that controls a head that reads data from and writes data to a recording medium of which a spinning speed is controlled based on a clock signal includes a clock-error detecting unit that detects an error in the clock signal, and a head-retraction control unit that controls the head in such a way that the head is safely retracted when the error is detected by the clock-error detecting unit.

6 Claims, 4 Drawing Sheets

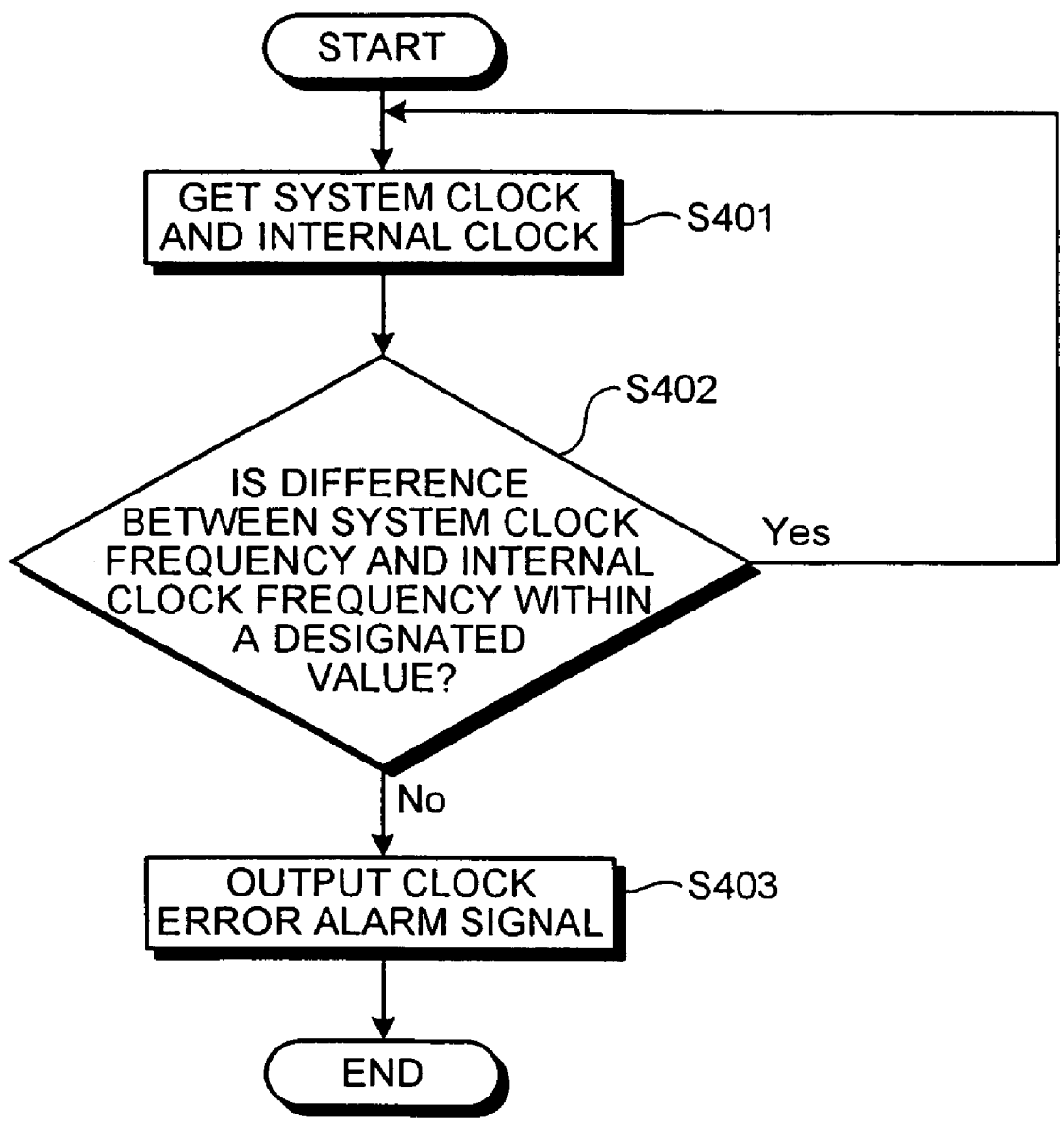

METHOD AND APPARATUS FOR HEAD CONTROL, AND DISK-DRIVE APPARATUS

BACKGROUND OF THE INVENTION

1) Field of the Invention

The present invention relates to a head control method, a head control apparatus, and a disk-drive apparatus that control a retraction of a head that reads data from or writes data to a recording medium, whose spinning speed is controlled by a clock signal. More particularly, the present invention relates to a head control method, a head control apparatus, and a disk-drive apparatus that control a safe retraction of a data reading/writing head when an error occurs in the clock signal.

2) Description of the Related Art

Conventionally, when writing data to or reading data from a magnetic disk recording medium, such as a hard disk, a data reading/writing head is slightly raised from the surface of the magnetic disk due to a flow of air on the surface of the magnetic disk caused by the rapid spinning of the magnetic disk.

However, if the spinning speed of the magnetic disk slows down when data reading or writing is taking place, the flow of air becomes feeble. The feeble airflow is not enough to sustain the raised position of the head and causes the head to touch or stick fast to the magnetic disk due to suction, damaging the magnetic disk and causing fatal damage to the hard disk apparatus and the data stored in the hard disk apparatus.

A disk-drive apparatus is disclosed in Japanese Patent Laid-Open Publication No. H11-16259 and another in U.S. Pat. No. 6,476,996 which monitors the spinning speed of the magnetic disk and safely retracts the head when any abnormality occurs in the spinning speed.

However, the conventional disk-drive apparatuses disclosed in Japanese Patent Laid-Open Publication No. H11-16259 and U.S. Pat. No. 6,476,996 measure the spinning speed of the magnetic disk by referring to the cyclic clock signal generated by a clock circuit. However, if an error occurs in the clock signal, it leads to incorrect calculation of the spinning speed, consequently affecting the timely retraction of the head.

An error in the clock signal may occur, for instance, due to the attributes of a phase locked loop (PLL) circuit incorporated in the clock circuit. The PLL circuit is a high impedance analog circuit and is vulnerable to static electricity as compared to circuits using other logic. Consequently, an error of the clock signal can easily occur due to static electricity noise. Thus, when subjected to static electricity noise, the clock circuit generates an erroneous clock signal.

Since the control of the spinning speed of the magnetic disk is performed based on the frequency of the clock signal, an error in the clock signal leads to decreased spinning speed of the magnetic disk, causing the head to touch or stick fast to the magnetic disk due to suction, leading to fatal damage to the hard disk apparatus and the data stored in the hard disk apparatus.

Thus, a technology is needed that enables a safe retraction of the head when an error occurs in the clock signal.

SUMMARY OF THE INVENTION

It is an object of the present invention to solve at least the above problems.

A head control method according to one aspect of the present invention, which is for controlling a retraction of a head that reads data from and writes data to a recording medium of which a spinning speed is controlled based on a clock signal, includes detecting that detects an error in the clock signal; and controlling the head in such a way that the head is safely retracted when an error is detected at the detecting.

A head control apparatus according to another aspect of the present invention, which controls a retraction of a head that reads data from and writes data to a recording medium of which a spinning speed is controlled based on a clock signal, includes a clock error detecting unit that detects an error in the clock signal; and a head-retraction control unit that controls the head in such a way that the head is safely retracted when an error is detected by the clock error detecting unit.

A disk-drive apparatus according to still another aspect of the present invention includes a head control apparatus that controls a retraction of a head that reads data from and writes data to a recording medium of which a spinning speed is controlled based on a clock signal. The head control apparatus includes a clock error detecting unit that detects an error in the clock signal; and a head-retraction control unit that controls the head in such a way that the head is safely retracted when an error is detected by the clock error detecting unit.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 4 is a flow chart of a clock signal error detection process carried out by the clock error detecting unit shown in FIG. 1.

DETAILED DESCRIPTION

Exemplary embodiments of a method and an apparatus for head control, and a disk-drive apparatus according to the present invention are explained in detail with reference to the accompanying drawings.

Figure 1:
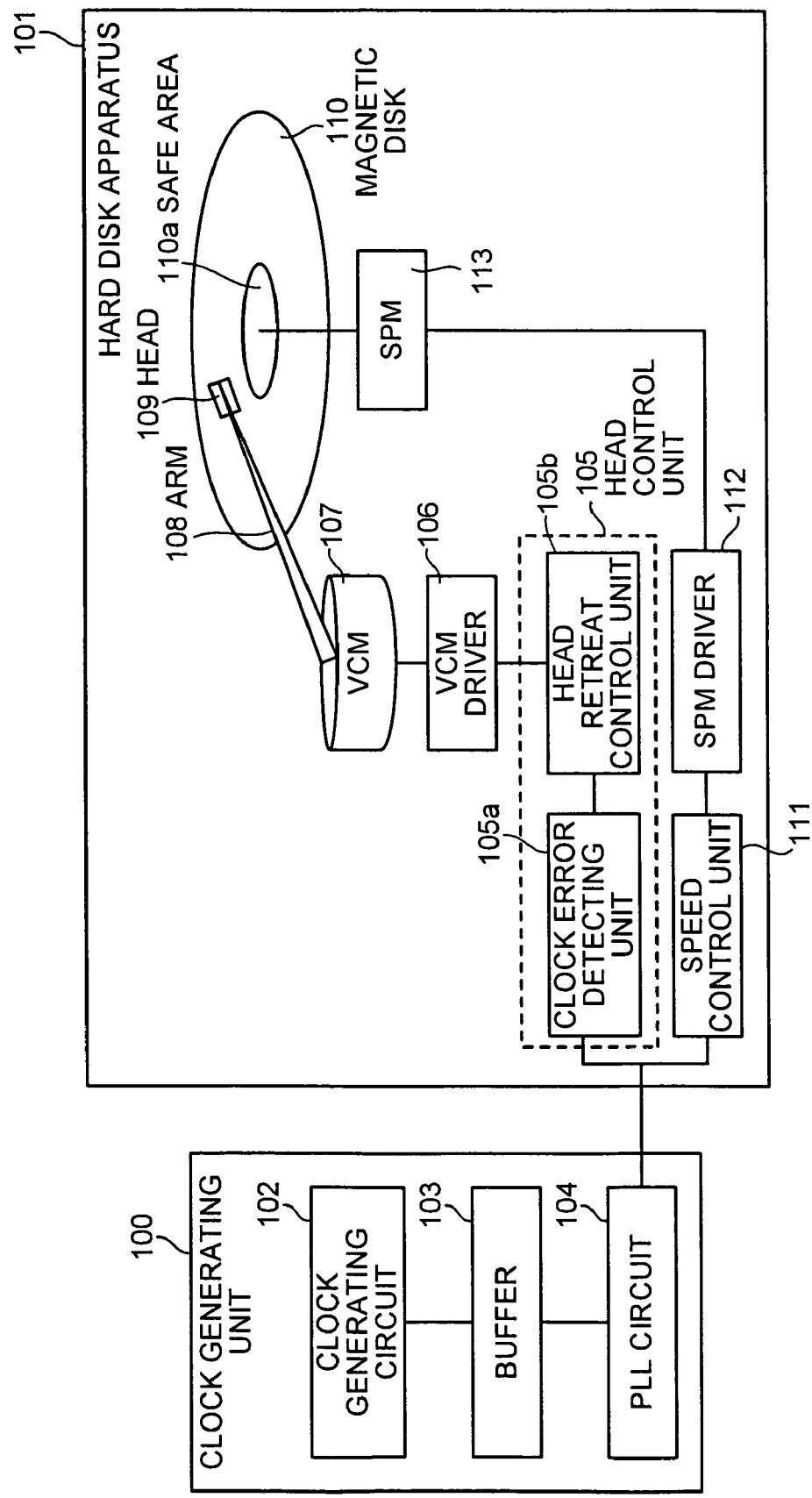
FIG. 1 is a functional block diagram of a disk-drive apparatus according to an embodiment of the present invention.

A functional configuration of a disk-drive apparatus according to an embodiment of the present invention is explained first. FIG. 1 is a functional block diagram of the disk-drive apparatus according to an embodiment of the present invention.

As shown in FIG. 1, a clock generating unit 100 is connected to a disk-drive apparatus 101. The clock generating unit 100 generates a clock signal composed of a cyclic pulse signal and inputs the generated clock signal to the disk-drive apparatus 100. The disk-drive apparatus 101 controls the spinning speed of the magnetic disk based on the clock signal.

The disk-drive apparatus 101 monitors the input clock signal, and if an error is found in the clock signal, causes the head to retract. Thus, the head touching or sticking fast to the surface of the magnetic disk due to suction, and causing fatal damage can be prevented.

The clock generating unit 100 includes a clock generating circuit 102, a buffer 103, and a phase locked loop circuit (PLL circuit) 104.

The clock generating circuit 102 has a quartz oscillator and generates clock signal having regular intervals. The buffer 103 converts the clock signal generated by the clock generating circuit 102 into a square wave clock signal and outputs the square wave clock signal to the PLL circuit 104. The PLL circuit 104 doubles or stabilizes the frequency of the received clock signal.

The hard disk apparatus 101 according to the present invention includes a head control unit 105, a voice coil motor (VCM) driver 106, a VCM 107, an arm 108, a head 109, a magnetic disk 110, a speed control unit 111, a spindle motor (SPM) driver 112, and an SPM 113.

The head control unit 105 controls the position of the head by controlling the movement of the arm 108 that supports the head 109. The head control unit 105 includes a clock error detecting unit 105a and a head-retraction control unit 105b.

The clock error detecting unit 105a monitors the clock signal generated by the clock generating unit 100 and when an error is detected, outputs an alarm signal to the head-retraction control unit 105b. The head-retraction control unit 105b outputs to the VCM driver 106 a retract signal that requests a safe retraction of the head 109.

The VCM driver 106 carries out a torque control of the VCM by controlling the current output to the VCM. Upon receiving the retract signal from the head-retraction control unit 105b, the VCM driver 106 controls the torque of the VCM in such a way that the head 109 is safely retracted. The VCM 107 determines the position of the head 109 by causing the arm 108 to move.

The arm 108 supports the head 109. The head 109 is mounted on the arm 108. The head 109 writes data by changing the magnetization direction of a magnetic material on the surface of the spinning magnetic disk 110, and reads data by detecting the magnetization direction.

The magnetic disk 110 stores data. The surface of the magnetic disk 110 has a coating of the magnetic material. The magnetic disk 110 includes a safe area 110a. When the magnetic disk 110 is not spinning, the head 109 retracts to the safe area 110a.

The safe area 110a is not related in any way to the data storage area. The retracting of the head 109 to the safe area 110a prevents damage to the data storage area when the magnetic disk 110 is not spinning.

The speed control unit 111 controls the spinning speed of the magnetic disk 110. To be specific, the speed control unit 111 calculates the rotation cycle (=1/number of rotations) of the target magnetic disk by counting the clock signals and determines the difference between the calculated rotation cycle and an actual rotation cycle. The speed control unit 111 then outputs to the SPM driver 112 the control signal such that the difference is narrowed.

The SPM driver 112 controls the current output to the SPM 113 and controls the number of rotations of the SPM 113. The SPM 113 is a motor that spins the magnetic disk 110.

The retraction of the head 109 specifically involves the following steps. Electricity is generated by the inertia of the spinning magnetic disk 110. The generated electric power operates the VCM driver 106 and the VCM 107, which in turn cause the head 109 to retract to the safe area 110a. In this way, the head is safely retracted even when an error occurs in a not shown power source that supplies power to the hard disk apparatus 101.

Figure 2:
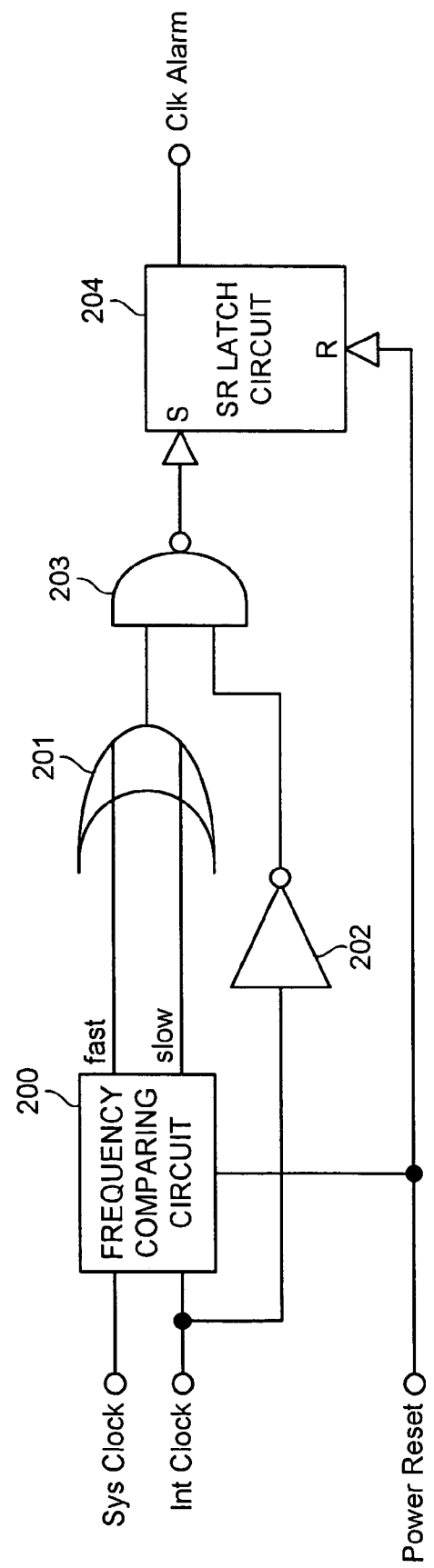
FIG. 2 is a drawing of a circuit structure of a clock error detecting unit shown in FIG. 1.
Figure 3:
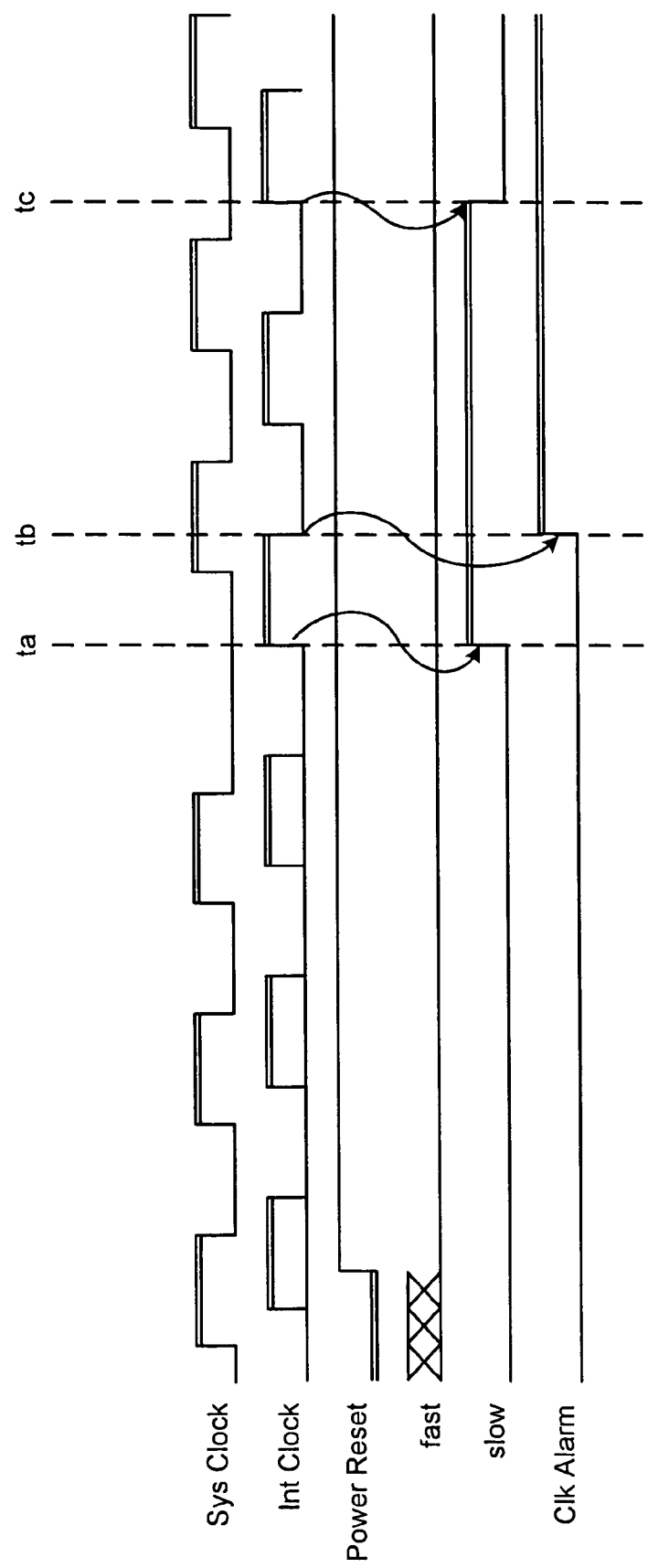
FIG. 3 is a timing chart of the circuit shown in FIG. 2.

A circuit structure and working of the clock error detecting unit 105a shown in FIG. 1 is explained next. FIG. 2 is a drawing of the circuit structure of the clock error detecting unit 105a shown in FIG. 1. FIG. 3 is a timing chart of the circuit shown FIG. 2.

The clock error detecting unit 105a receives a system clock (Sys Clock), which is the clock signal whose frequency is to be checked for error and an internal clock (Int Clock), which is a reference clock signal with which the system clock is to be compared. If there is a difference between the system clock and the internal clock, the clock error detecting unit 105a outputs the alarm signal (Clk Alarm).

The clock error detecting unit 105a includes a frequency comparing circuit 200, a logical add (OR) circuit 201, a NOT circuit 202, a negative AND (NAND) circuit 203, a Set-Reset (SR) latch circuit 204, and a not shown internal clock transmitting circuit.

A power reset terminal is provided for the frequency comparing circuit 200 and the SR latch circuit 204 for switching the circuits OFF or ON. The circuit is in an OFF state when the level of the voltage signal entering the terminal is Low and an ON state when the level is High.

The working of the clock error detecting unit 105 is explained next. The system clock and the internal clock first enter the frequency comparing circuit 200 and the frequencies of the two clocks are compared. If the frequency of the system clock is taken as fsys and the frequency of the internal clock as taken as fint, and fsys is less than fint (fsys<fint), the frequency comparing circuit 200 sets the voltage signal level of the slow output terminal as High.

Conversely, if the fsys is greater than fint (fsys>fint), the frequency comparing circuit 200 sets the voltage signal level of the fast output terminal as High. If the absolute difference between fsys and fint is less than a designated value T (fsys−fint≦T), the frequency comparing circuit 200 sets the voltage signal level of both slow and fast output terminals as Low.

FIG. 3 illustrates an instance of fsys being less than fint, and the voltage signal levels of the fast and slow output terminals. When it is detected that the frequency of the system clock is less than the frequency of the internal clock at time ta, the voltage signal level of the slow output terminal is set to High. Further, when it is detected that the absolute difference between the frequencies of fsys and fint is less then T at time tc, the voltage signal level of the slow output terminal reverts to Low.

Referring back to FIG. 2, the logical sum circuit 201 outputs a logical sum voltage signal of the fast and slow output terminals. Meanwhile, the NOT circuit 202 outputs NOT signal of the internal clock. The negative AND circuit 203 outputs a negative AND signal obtained from the logical sum signal output by the logical sum circuit 201 and the NOT signal output by the NOT circuit 202.

The SR latch circuit 204 outputs the alarm signal based on the signal output by the negative AND circuit 203. To be specific, if the level of the voltage signal output by the negative AND circuit 203 changes from High to Low, the voltage level of the output terminal is set to High.

In the example shown in FIG. 3, at time tb the voltage signal level of the slow output terminal is High and the voltage signal level of the of the internal clock has changed from High to Low. Consequently, the level of the voltage signal output by the negative AND circuit 203 changes from High to Low, and the level of the alarm output from the SR latch circuit 204 changes from Low to High.

Further, at time tc, irrespective of whether the voltage signal level of the slow output terminal has returned to Low, the voltage signal level of the alarm signal remains High until the SR latch circuit 204 is reset.

Thus, frequency error in the clock signal can be accurately detected digitally by means of the frequency comparing circuit 200 and the SR latch circuit 204.

A clock signal error detection process carried out by the clock error detecting unit 105a shown in FIG. 1 is explained next. FIG. 4 is a flow chart of the clock signal error detection process carried out by the clock error detecting unit 105a shown in FIG. 1.

The clock error detecting unit 105a first gets the system clock and the internal clock as the reference signal for comparing the system clock with (Step S401). The clock error detecting unit 105a then checks whether the difference between the frequencies of the system clock and the internal clock is within a designated value (Step S402). If the difference is within the designated value ("Yes" at Step S402), the clock error detecting unit 105a recognizes the system clock to be error-free and returns to Step S401.

If the difference is not within the designated value ("No" at Step S402), the clock error detecting unit 105a outputs to the head-retraction control unit 105b the alarm signal indicating an error in the system clock (Step S403), causes the head-retraction control unit 105b to safely retract the head 109, and ending the clock signal error detection process.

Thus, according to the present embodiment, the clock error detecting unit 105a detects whether the frequency of the system clock input into the hard disk apparatus has error. If error is detected, the head-retraction control unit 105b causes the head 109 to retract to the safe area 110a of the magnetic disk 110. Consequently, a safe retraction of the head 109 is carried out if an error occurs in the system clock.

According to the present embodiment, an error in the clock signal is detected digitally by means of the frequency comparing circuit 200. However, an analog process may be used to detect an error in the clock signal.

An error in the clock signal may for instance be detected by using a transition phenomenon of a circuit in which a resistor and a condenser are connected in series. The transition phenomenon is characterized by the product RC of a resistance R of the resistor and the capacitance C of the condenser. The product RC is called time constant.

The error detecting circuit includes a charging power source Icr with a switch to charge the condenser and a discharging power source Idr with a switch to discharge the condenser.

When the voltage level of the internal clock generated by the internal clock generating circuit, which causes the generation of the reference clock signal, begins to rise from Low to High, it acts as a trigger for beginning the charging of the condenser. When the voltage level of the system clock that monitors whether any error has occurred in the frequency begins to rise from Low to High, it acts as a trigger for beginning the discharging of the condenser.

It can be detected that the input clock signal is less than a predetermined frequency, and therefore erroneous, by slicing the terminal voltage of the serial circuit to a predetermined level using a voltage comparator and latching the output.

Apart from the methods described above, various methods can be used to detect error in the clock signal digitally or by analog process.

Moreover, according to the present embodiment, error detection of a clock signal output by the PLL circuit 104 is described. However, error detection of the clock signal output by other circuits, such as the clock generating circuit 102 and input into the hard disk apparatus 101 may be carried out.

According to the present embodiment, the head 109 retracts to the safe area 110a provided on the magnetic disk 110 itself. However, the present invention may be applied to a lamp head retract method, wherein the head 109 retracts to a lamp, which is a head shelter, provided outside of the magnetic disk 110.

The constituent elements of the hard disk apparatus 101 illustrated are merely conceptual and may not necessarily physically resemble the structures shown in the drawings. For instance, the device need not necessarily have the structure that is illustrated. The device as a whole or in parts can be broken down or integrated either functionally or physically in accordance with the load or how the device is to be used.

According to the present invention, clock signal is monitored for error. If error is detected, the head is safely retracted. Consequently, the data reading/writing head is safely retracted if any error occurs in the clock signal.

Furthermore, according to the present invention, an error in the clock signal output by the phase locked loop circuit can be detected. Consequently, if error occurs in the clock signal output by the phase locked loop circuit due to static current, etc., the data reading/writing head is safely retracted.

Moreover, according to the present invention, an error in the clock signal is detected by comparing the frequencies of the clock signal and the reference clock signal by means of a digital frequency comparing circuit that outputs the difference between the two frequencies in the form of a digital signal. Consequently, an error in the clock signal can be unambiguously detected by accurately determining the difference between the two frequencies using a digital signal process, and the data reading/writing head can be safely retracted.

Furthermore, according to the present invention, an error in the clock signal can be detected by comparing the frequencies of the clock signal and the reference clock signal by means of an analog frequency comparing circuit that employs a transition phenomenon involving charging and discharging of the condenser in the serial circuit consisting of a resistor and a condenser. Consequently, an error in the clock signal can be detected by means of the simple-structured, rugged, and inexpensive analog circuit and the data reading/writing head can be safely retracted.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A head control method of controlling a retraction of a head that reads data from and writes data to a recording medium of which a spinning speed is controlled based on a clock signal, the head control method comprising:

detecting an error in the clock signal by comparing frequencies between the clock signal and a reference clock signal; and controlling the head in such a manner that the head is safely retracted when the error is detected at the detecting step, wherein the detecting step includes determining a difference of the frequencies as the error when the difference of the frequencies does not fall within a predetermined value.

2. A head control method of controlling a retraction of a head that reads data from and writes data to a recording medium of which a spinning speed is controlled based on a clock signal, the head control method comprising:
 detecting an error in the clock signal and
 controlling the head in such a manner that the head is safely retracted when an error is detected at the detecting step.
 wherein the detecting step includes detecting an error in the clock signal by comparing a frequency of the clock signal and a frequency of a reference clock signal using an analog frequency comparing circuit that employs a transition phenomenon involving charging and discharging of a condenser in a serial circuit consisting of a resistor and the condenser.

3. A head control apparatus that controls a retraction of a head that reads data from and writes data to a recording medium of which a spinning speed is controlled based on a clock signal, the head control apparatus comprising:
 a clock error detecting unit that detects an error in the clock signal by comparing frequencies between the clock signal and a reference clock signal; and
 a head-retraction control unit that controls the head in such a way that the head is safely retracted when the error is detected by the clock error detecting unit,
 wherein the clock error detecting unit determines a difference of the frequencies as the error when the difference of the frequencies does not fall within a predetermined value.

4. A head control apparatus that controls a retraction of a head that reads data from and writes data to a recording medium of which a spinning speed is controlled based on a clock signal, the head control apparatus comprising:
 a clock error detecting unit that detects an error in the clock signal and
 a head-retraction control unit that controls the head in such a way that the head is safely retracted when an error is detected by the clock error detecting unit,
 wherein the clock error detecting unit detects an error in the clock signal by comparing a frequency of the clock signal and a frequency of a reference clock signal using an analog frequency comparing circuit that employs a transition phenomenon involving charging and discharging of a condenser in a serial circuit consisting of a resistor and the condenser.

5. A disk-drive apparatus comprising a head control apparatus that controls a retraction of a head that reads data from and writes data to a recording medium of which a spinning speed is controlled based on a clock signal, wherein the head control apparatus includes:
 a clock error detecting unit that detects an error in the clock signal by comparing frequencies between the clock signal and a reference clock signal; and
 a head-retraction control unit that controls the head in such a way that the head is safely retracted when the error is detected by the clock error detecting unit,
 wherein the clock error detecting unit determines a difference of the frequencies as the error when the difference of the frequencies does not fall within a predetermined value.

6. A disk-drive apparatus comprising a head control apparatus that controls a retraction of a head that reads data from and writes data to a recording medium of which a spinning speed is controlled based on a clock signal, wherein the head control apparatus includes:
 a clock error detecting unit that detects an error in the clock signal; and
 a head-retraction control unit that controls the head in such a way that the head is safely retracted when an error is detected by the clock error detecting unit.
 wherein the clock error detecting unit detects an error in the clock signal by comparing a frequency of the clock signal and a frequency of a reference clock signal using an analog frequency comparing circuit that employs a transition phenomenon involving charging and discharging of a condenser in a serial circuit consisting of a resistor and the condenser.

* * * * *